United States Patent
Giffard

[11] 3,785,497
[45] Jan. 15, 1974

[54] FILTERING ELEMENT
[76] Inventor: Louis Giffard, 11, rue Houvenagle, Saint-Brieuc, France
[22] Filed: Jan. 12, 1972
[21] Appl. No.: 217,368

[30] Foreign Application Priority Data
Oct. 26, 1971 France.................. 7,138,401

[52] U.S. Cl............. 210/282, 206/46, 229/DIG. 12
[51] Int. Cl............................................. B01d 27/08
[58] Field of Search..................... 206/46 R, 46 FC; 210/282, 283, 350, 484; 229/DIG. 12; 99/77.1

[56] References Cited
UNITED STATES PATENTS
2,562,735  7/1951  Pick.................................. 210/282
3,374,882  3/1968  Amaliksen........................ 206/46 R
1,723,564  8/1929  Lewis................................ 210/282

Primary Examiner—Samih N. Zaharna
Assistant Examiner—Ivars Cintins
Attorney—Cushman, Darby & Cushman

[57] ABSTRACT

The invention relates to a filter or filtering element used alone or in juxtaposition with other elements of the same kind, for the purpose of purifying a fluid, which element constitutes an enclosure acting as a container for the pulverulent product and comprises a substantially rigid surrounding member optionally rigidly connected to a cover and base through which the fluid to be treated may pass, and is characterised in that at least one of the walls of said enclosure is made of a vinyl material which contracts under heat so as to enable the volume of the enclosure to be reduced after it has been completely filled with pulverulent product.

11 Claims, 3 Drawing Figures

PATENTED JAN 15 1974 3,785,497

FILTERING ELEMENT

FIELD OF THE INVENTION

The invention relates to a filter or filtering element containing a pulverulent product and used in the purification of fluids.

BACKGROUND OF THE INVENTION

It is well known that the main drawback of filters of this kind results from the caking of the powder, for example active charcoal, in their containers under the effect either of the vibrations of the installation or of the thrust of the fluid. It is well known that this caking not only alters the pressure-loss suffered by the fluid, but also causes segregation of particles of different sizes so that the filtration conditions are altered during the period of use of the filter. This is particularly so when the filtering elements have a large active surface. Filters of this latter type also carry the drawback of being heavy as result of the metal frame for imparting rigidity to them, the powder being contained between two layers of felted fibres known as "non-woven" fibres. In practice, therefore, such filters can only be used in the horizontal position since in any other position the upper portion of the active surface would cease to exercise a suitable filtering effect as it would no longer be in contact with the powder that will have moved downwards by gravity.

OBJECT OF THE INVENTION

The invention aims at providing a filter structure that eliminates these drawbacks.

SUMMARY OF THE INVENTION

The filtering element in accordance with the invention constitutes an enclosure acting as a container for the pulverulent products and comprises a substantially rigid surrounding member optionally rigidly connected to a cover and a base through which the fluid to be treated may pass, and is characterised in that at least one of the walls of said enclosure is made of a vinyl material which contracts under heat, so as to enable the volume of the enclosure to be reduced after it has been completely filled with pulverulent product.

Thus, because of the diminution of volume resulting from the contraction, the pulverulent product undergoes compression which expels the air between the particles and compacts the filtering mass, thus preventing subsequent caking as well as segregation.

To facilitate reduction of the volume of the enclosure, said wall made of material which contracts under heat is the base of the enclosure, and this base takes the form of a dish or cup, the upper edges of which are attached to the lower edges of the surrounding member.

The filtering element may be used separately when a relatively small filtering surface is required. On the other hand, in the case of large filtering surfaces, the filtering element is welded by the edges of its collar to other elements, preferably of the same kind, so as to constitute the active surface of a filter.

Other features and advantages of the invention will emerge from the following description which refers to the accompanying drawings, provided by way of non-limiting example, and which will explain how the present invention may be put into use.

DESCRIPTION OF SPECIFIC EMBODIMENTS

As will be seen from these Figures, the filtering element according to the invention comprises a cover $F_1$ and a base $F_2$ which are solidly interconnected by a surrounding member C, the enclosure thus formed being completely filled with the pulverulent filtering product P.

Figure 1:
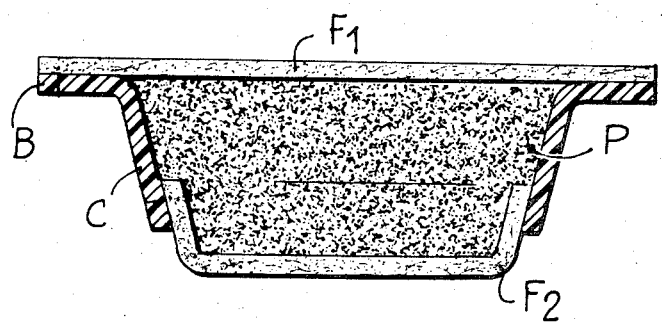
FIGS. 1 and 2 illustrate two embodiments of the invention.

In the case of the embodiment illustrated in FIG. 1, the base $F_2$ is moulded to the form of a dish from a sheet of felted non-woven fibres, the upper edges of which are secured (for example by H. F. welding) to the lower edges of the surrounding member C, and in such a manner as to permit sufficient contraction of the P.V.C. fibres (for example fibres sold in France under the trade-name Rhovyl) in order to effect a considerable diminution of the enclosure and consequently efficient compression of the powder, thereby expelling the air between the particles.

Figure 2:
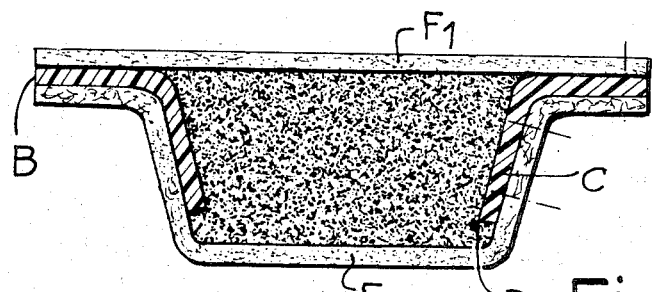

In the case of the embodiment illustrated in FIG. 2, the dish constituting the base $F_2$ has walls which extend upwards to the cover $F_1$, the surrounding member C merely acting as a simple reinforcing covering inside or outside the dish.

In these two cases, the surrounding member is made of a semi-rigid plastics material and is attached to the cover and base either by bonding or welding, and in particular by high-frequency welding.

Particularly, in the case of low capacity filters it would also be possible to rigidize the walls of the dish of the second embodiment by hardening said walls either by the use of a thermosetting bonding agent, or by "vitrifying" them by a heating process, for example a high-frequency method, and this would render the surrounding member C unnecessary.

In most cases the element is provided with a collar or flange B for fixing it in the structure of the filter. This collar, which may also be used as a support for the cover $F_1$, may be integral either with the surrounding member C or with the dish constituting the base $F_2$ or with both.

The element may be used separately if its surface is not large, but preferably it is arranged in juxtaposition (FIG. 3) with other similar elements to form the general filtering surface.

The Applicant has in fact found that if the surface of the dish or cup is too great, the quantity of powder is too large for the mixture to remain in the filled-up state without segregation, which segregation is subsequently promoted by a lower degree of compression due on the one hand to the deformation of the base by the charge and on the other hand to the spreading of the effect of contraction over a greater volume.

Figure 3:
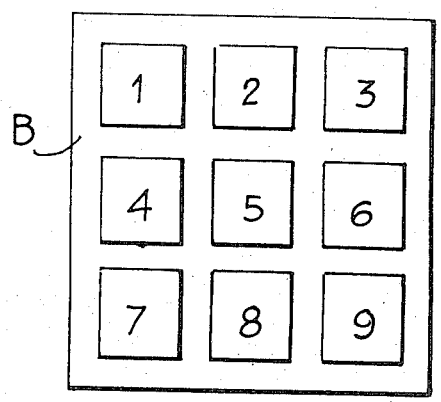
FIG. 3 is a diagrammatic view showing nine filtering elements grouped together to form the active surface of a filter.

In the case of FIG. 3, the dishes are connected by their collars or flanges B, or are assembled in a common supporting plate.

What is claimed is:

1. A filtering element housing a pulverulent product for use in fluid purification comprising: a first porous means through which fluid to be treated may pass; a second porous means through which the fluid to be treated may pass and being operatively connected to the first means; the first and second means define a pulverulent enclosure therebetween, wherein the enclosure is completely filled by the pulverulent; at least one of the first and second means being made of a heat contractable material, which is heated to contract causing the volume of the enclosure to also contract so as to compress the pulverulent thereby, expelling air from the pulverulent, whereby caking and segregation of the pulverulent during use are eliminated.

2. The filtering element according to claim 1 further comprising: a substantially rigid surrounding member interconnected between the first means, and the second means for reinforcing the rigidity of the filtering unit.

3. The filtering element according to claim 1 wherein at least one of the first and second means is made of a substantially rigid material.

4. The filtering element according to claim 1 wherein the heat contractable material is comprised of a vinyl material.

5. The filtering element according to claim 2 wherein the first means made of material which contracts under heat is a base and takes a form of a cup, the upper edges of which are connected to the lower edges of the surrounding member.

6. The filtering element according to claim 2 wherein the surrounding member is made of rigidized felted non-woven fibres.

7. The filtering element according to claim 1 wherein the second means is made of a substantially rigid plastic material.

8. The filtering element according to claim 7 wherein the filtering element is rigidized by having the first and second means and the surrounding member interconnected with respect to each other by a H. F. weld.

9. The filtering element according to claim 2 characterized in that the surrounding member comprises a horizontal collar.

10. The filtering element according to claim 9 wherein the collar is connected at the edge thereof to at least other filtering means to form an active filter surface that presents plurality of filters which spread the effect of contraction of the pulverulent over a greater volume, thereby eliminating segregation of the pulverulent.

11. The filtering element according to claim 10 wherein the other filtering means are comprised of a plurality of filtering elements.

* * * * *